No. 867,086. PATENTED SEPT. 24, 1907.
C. SULLIVAN.
FRYING PAN.
APPLICATION FILED FEB. 15, 1907.
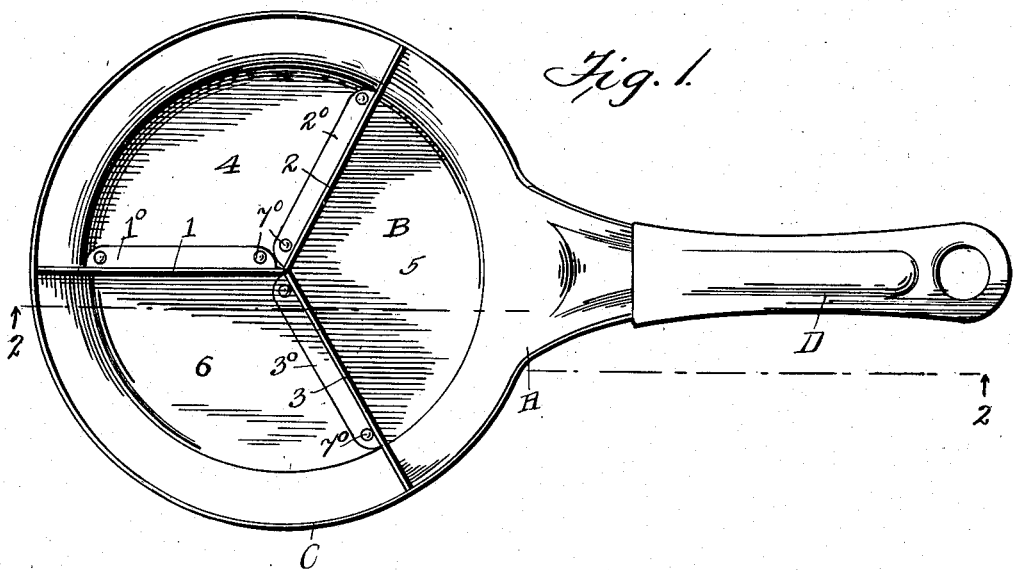
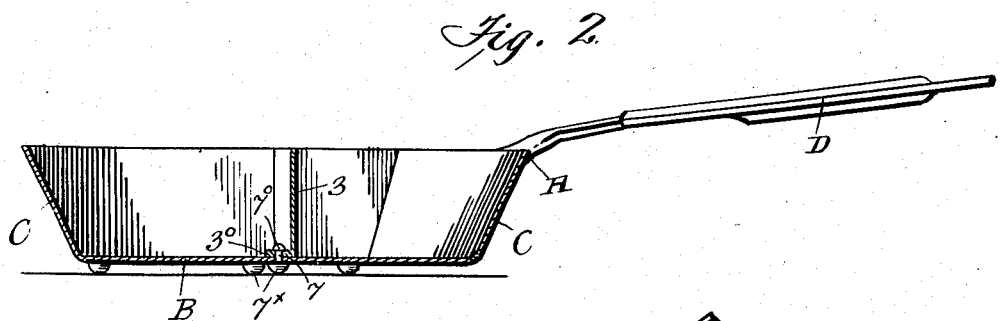
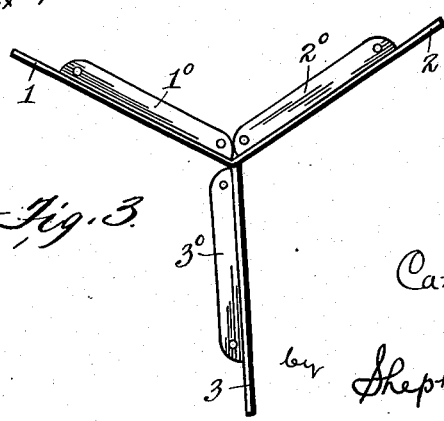
Witnesses
Chas. K. Davies.
Myron G. Clear
Inventor
Catherine Sullivan,
by Shepherd & Parker
Attorneys

UNITED STATES PATENT OFFICE.

CATHERINE SULLIVAN, OF CHICAGO, ILLINOIS.

FRYING-PAN.

No. 867,086.  Specification of Letters Patent.  Patented Sept. 24, 1907.

Application filed February 15, 1907. Serial No. 357,519.

*To all whom it may concern:*

Be it known that I, CATHERINE SULLIVAN, a citizen of the United States, residing at Chicago, in the county of Cook and State of Illinois, have invented certain new and useful Improvements in Frying-Pans, of which the following is a specification.

This invention relates to an attachment for the ordinary frying pan, and is in the nature of a series of division walls or partitions creating a number of compartments within the pan in order that a number of different commodities may be cooked therein without mixing.

To this end the present invention consists in the arrangement of the partitions and the manner and means of attaching them to the pan and the protection afforded the frying pan itself.

In the accompanying drawing, forming a part of my invention Figure 1 is a plan view of a frying pan provided with my improvements. Fig. 2 is a section of the same on line 2—2 of Fig. 1, and Fig. 3 is a plan view of the partitions removed from the pan.

Referring to the figures, A indicates a frying pan of the ordinary type comprising the bowl portion B with the slightly flaring side C and handle D. The partitions 1, 2 and 3 divide the pan as shown, into compartments 4, 5 and 6, in each of which a different commodity may be cooked without any two or all mixing. The partitions 1 and 2 are preferably constructed from one piece of sheet metal and are provided with lateral flanges $1^\circ$ and $2^\circ$ respectively adapted to lie close upon the bottom of the pan when inserted therein. When cutting said partition out from the blank it will be necessary of course to cut a substantially V shaped piece out of the lateral flanges in order to leave a slight clearance between the adjacent ends of the flanges $1^\circ$ and $2^\circ$, when the blank, after cutting, is bent to form the partitions 1 and 2 as shown. The partition 3, is similarly provided with a lateral flange $3^\circ$ and is attached to the partitions 1 and 2 at their point of bending by solder or other suitable means. The partitions are cut with beveled outer ends, their greatest length being at the top to conform to the side C of the frying pan.

The partitions are riveted to the pan bottom B, by means of rivets 7 passing through the lateral flanges of the partitions and through the pan bottom and having very small heads $7^\circ$, formed thereon inside the pan in order not to interfere with the cooking, while they have large heads $7^\times$ formed thereon on the outside of the pan for the purpose of forming a series of supports to hold the bottom of the pan from direct contact with the stove.

Having fully described my invention I claim:

1. In a device of the character described, the combination with a frying pan, of a series of vertically arranged partitions therein, said partitions being constructed and arranged to conform to the shape of the said pan and provided with laterally extending flanges adapted to lie close to the bottom of said pan and a series of rivets passing through said flanges and the bottom of the pan and having large heads formed thereon outside the pan to hold same from direct contact with the stove, substantially as described.

2. In a device of the character described, the combination with the frying pan, of a pair of partitions constructed of a single piece of sheet metal and bent angularly midway their length to fit within the said pan, a third partition arranged at an angle to said first named partitions and suitably connected thereto at the point of bending, said partitions being also provided with laterally extending flanges lying in close contact with the bottom of said pan and riveted thereto, to securely hold the partitions in place, substantially as described.

In testimony whereof I affix my signature in presence of two witnesses.

CATHERINE SULLIVAN.

Witnesses:
JOHN W. BRITTON,
C. A. MCGARVEY.